(12) United States Patent
Reichholf et al.

(10) Patent No.: US 11,769,890 B2
(45) Date of Patent: Sep. 26, 2023

(54) SOEC SYSTEM AND METHOD FOR OPERATING A SOEC SYSTEM

(71) Applicant: AVL List GmbH, Graz (AT)

(72) Inventors: David Reichholf, Graz (AT); Rene Buchgraber, Gleisdorf (AT); Franz Koberg, Graz (AT)

(73) Assignee: AVL List GmbH, Graz (AT)

( * ) Notice: Subject to any disclaimer, the term of this patent is extended or adjusted under 35 U.S.C. 154(b) by 33 days.

(21) Appl. No.: 17/623,937

(22) PCT Filed: Jul. 2, 2020

(86) PCT No.: PCT/AT2020/060260
§ 371 (c)(1),
(2) Date: Dec. 30, 2021

(87) PCT Pub. No.: WO2021/000003
PCT Pub. Date: Jan. 7, 2021

(65) Prior Publication Data
US 2022/0367892 A1    Nov. 17, 2022

(30) Foreign Application Priority Data
Jul. 2, 2019  (AT) .............................. A 50599/2019

(51) Int. Cl.
*H01M 8/04746*  (2016.01)
*H01M 8/2457*  (2016.01)
(Continued)

(52) U.S. Cl.
CPC ... *H01M 8/04753* (2013.01); *H01M 8/04097* (2013.01); *H01M 8/04201* (2013.01);
(Continued)

(58) Field of Classification Search
CPC ............................................ H01M 2008/1293
See application file for complete search history.

(56) References Cited

U.S. PATENT DOCUMENTS

2009/0155092 A1  6/2009  Fukuma
2016/0204454 A1*  7/2016  Hakala .............. H01M 8/04201
                                                429/415

FOREIGN PATENT DOCUMENTS

DE    102007004590    7/2008
DE    102013223903    5/2014
(Continued)

OTHER PUBLICATIONS

International Search Report and the Written Opinion dated Oct. 5, 2020 From the International Searching Authority Re. Application No. PCT/AT2020/060260 and Its Translation of Search Report Into English. (12 Pages).

*Primary Examiner* — Haroon S. Sheikh

(57) ABSTRACT

The present invention relates to an SOEC system (1), comprising a fuel cell stack (2) having a gas side (3) and an air side (4), and an ejector (5) for supplying a process fluid to a gas inlet (6) on the gas side (3), wherein the ejector (5) comprises a primary inlet (7), for introducing a water-containing primary process fluid through a primary line (8) of the SOEC system (1) into a primary portion (9) of the ejector (5), and a secondary inlet (10), for introducing recirculated secondary process fluid through a recirculation line (11) of the SOEC system (1) from a gas outlet (12) on the gas side (3) into a secondary portion (13) of the ejector (5), wherein the SOEC system (1) further comprises a control gas supply portion (14) for supplying control gas into the primary portion (9) and into the secondary portion (13) in order to control a pressure and/or mass flow in the primary portion (9) and in the secondary portion (13), and wherein the control gas supply portion (14) comprises a valve arrangement (19, 20) for controlling the pressure and/or the mass flow in the primary portion (9) and in the secondary portion (13).

(Continued)

The invention further relates to a method for operating an SOEC system (1) according to the invention.

10 Claims, 2 Drawing Sheets

(51) Int. Cl.
    *H01M 8/04089*     (2016.01)
    *H01M 8/04082*     (2016.01)
    *H01M 8/04537*     (2016.01)
    *C25B 1/04*     (2021.01)
    *C25B 15/02*     (2021.01)
    *C25B 15/08*     (2006.01)
    *H01M 8/12*     (2016.01)

(52) U.S. Cl.
    CPC ..... *H01M 8/04649* (2013.01); *H01M 8/2457* (2016.02); *C25B 1/04* (2013.01); *C25B 15/02* (2013.01); *C25B 15/08* (2013.01); *H01M 2008/1293* (2013.01)

(56) References Cited

FOREIGN PATENT DOCUMENTS

| | | | |
|---|---|---|---|
| EP | 2940773 A1 * | 11/2015 | ............... C25B 1/00 |
| EP | 3054519 | 8/2016 | |
| JP | 2011-179333 | 9/2011 | |
| KR | 10-2016-0049037 | 5/2016 | |
| WO | WO 2015/040270 | 3/2015 | |
| WO | WO 2016/161999 | 10/2016 | |

\* cited by examiner

SOEC SYSTEM AND METHOD FOR OPERATING A SOEC SYSTEM

RELATED APPLICATIONS

This application is a National Phase of PCT Patent Application No. PCT/AT2020/060260 having International filing date of Jul. 2, 2020, which claims the benefit of priority of Austria Patent Application No. A50599/2019 filed on Jul. 2, 2019. The contents of the above applications are all incorporated by reference as if fully set forth herein in their entirety.

FIELD AND BACKGROUND OF THE INVENTION

The present invention relates to an SOEC system, comprising a fuel cell stack having a gas side and an air side, and an ejector for supplying a process fluid to a gas inlet on the gas side, wherein the ejector comprises a primary inlet, for introducing a water-containing primary process fluid through a primary line of the SOEC system into a primary portion of the ejector, and a secondary inlet, for introducing recirculated secondary process fluid through a recirculation line of the SOEC system from a gas outlet on the gas side into a secondary portion of the ejector. The invention further relates to a method for operating an SOEC system of this kind.

SOEC systems, the core component of which is a fuel cell stack, have to be operated in specific operating states for appropriate functional and/or operating modes and desired service lives. This includes, in particular, a predefined supply of process gases to the fuel cell stack, i.e. a water- and/or water vapour-containing fluid to the gas side and air to the air side. During operation of an SOEC system, as in conventional fuel cell systems, a distinction is made between cathode and anode gas supply, in other words between the fuel and the air side, wherein the cathode corresponds to the fuel side and the anode to the air side in electrolysis operation. In high-temperature electrolysis with SOEC stacks, gas, in particular water vapour and carbon dioxide, is fed in on the fuel side. On the air side, air is generally used to purge the anode gas chamber. The air exits the fuel cell stack enriched with oxygen during operation. In order to prevent, as far as possible, degradation of the cells on the fuel side, in particular oxidation of the nickel catalyst, a reducing atmosphere must prevail on the fuel side, which reducing atmosphere should additionally be ensured in the gas supply by means of reducing species such as hydrogen and carbon monoxide.

In stand-alone systems without a test stand infrastructure or a separate storage tank with reducing species, the reducing atmosphere share must be provided directly from the system itself. This generally constitutes a significant challenge during development of SOEC systems and can be achieved by means of internal recirculation of hot exhaust gases from the fuel cell stack on the fuel side.

Recirculation requires suitable circuitry and a device that increases the pressure level of the exhaust gas portion to be recirculated. In modern SOEC systems, this is achieved using an ejector. A component of this kind is a static component that must be designed specifically for the desired operating points of the systems and is able to function without moving parts. In the ejector, a secondary flow, which fundamentally corresponds to the recirculated product gas from the gas side of the fuel cell stack, is mixed into the primary flow. The primary flow comprises media that must be supplied to the fuel cell stack in accordance with the functionality thereof, i.e. water vapour for the electrolysis, for example.

The pressure level of the primary flow must be increased by a specific amount depending on the function of an ejector, as a result of which the primary flow attains a high speed in the ejector nozzle and the outflowing jet generates a negative pressure in a mixing chamber of the ejector. The negative pressure causes the secondary flow to be entrained and admixed with the primary flow on account of a suction effect. On account of the invariable shape of the ejector, the suction effect, i.e. the recirculation effect, and the overall pressure increase depend on the relevant operating state of the SOEC system. Since the primary flow is directly related to the operating state at the fuel cell stack, this means that a maximum primary mass flow occurs in an operating state with maximum electrolysis activity. Furthermore, with an invariable shape of the nozzle of the ejector, there is also a maximum jet speed, which fundamentally results in the maximum recirculation rate and pressure increase at an ejector outlet. In partial load operating states and thus at smaller primary mass flows, the jet speed, the recirculation rate and the pressure increase that is possible decreases. In order to even achieve a required pressure increase at a specific recirculation rate, there must be a minimum primary mass flow. In other words, the recirculation required for system operation takes place from a specific minimum partial load operation and the recirculation rate increases as the load points increase towards full load.

One problem with the use of ejectors is the limited controllability. The components of an ejector fundamentally have an invariable shape, and therefore the characteristics for operation in the SOEC system are fixed. In principle, ejectors are designed for the main operating point and operate as much as possible in said operating point. With regard to the partial load range, as much freedom as possible is desired in order to be able to allow for reliable operation.

International patent application WO 2015/040270 A1 describes a reversibly operable SOFC/SOEC system in which a conventional ejector is arranged upstream of a reformer. It also describes means for supplying an additional fluid into the primary flow in order to regulate a fluid composition and/or a pressure in the ejector. Although this improves the controllability at the ejector, it does not satisfy the desired requirements.

SUMMARY OF THE INVENTION

The object of the present invention is to address the problem described above at least in part. In particular, the object of the invention is to provide an SOEC system and a method for operating an SOEC system that contribute to improving the controllability of an ejector in the SOEC system.

The object outlined above is achieved by means of the patent claims. In particular, the object outlined above is achieved by the SOEC system according to claim 1 and the method according to claim 9. Additional advantages of the invention can be derived from the dependent claims, the description and the drawings. Features and details that are described in connection with the SOEC system naturally also apply in connection with the method according to the invention and vice versa, and therefore reference is or can be made interchangeably to the disclosure of the individual aspects of the invention.

According to another aspect of the present invention, an SOEC system is proposed. The SOEC system comprises a fuel cell stack having a gas side and an air side, and an ejector for supplying a process fluid to a gas inlet on the gas side. The ejector comprises a primary inlet, for introducing a water-containing primary process fluid through a primary line of the SOEC system into a primary portion of the ejector, and a secondary inlet, for introducing recirculated secondary process fluid through a recirculation line of the SOEC system from a gas outlet on the gas side into a secondary portion of the ejector. The SOEC system additionally comprises a control gas supply portion for supplying control gas into the primary portion and into the secondary portion in order to control a pressure and/or mass flow in the primary portion and in the secondary portion, wherein the control gas supply portion comprises a valve arrangement for controlling the pressure and/or the mass flow in the primary portion and in the secondary portion.

The above-described SOEC system constitutes a solution to the object for improving the controllability of the ejector and of the secondary process fluid in the recirculation line. The invention relates to the manner in which the control gas is introduced. Said control gas can be admixed with the water-containing primary process fluid on the primary side of the ejector and also with the recirculation flow on the secondary side of the ejector. Admixing on the primary side can be understood to mean admixing at, in and/or upstream of the primary portion of the ejector. Admixing on the secondary side of the ejector can be understood to mean admixing at, in and/or upstream of the secondary portion of the ejector.

Admixing into the primary portion increases the mass and volumetric flow rate in the primary portion. This results in a correspondingly high initial pressure in a nozzle of the ejector and in a faster jet speed in the nozzle. As described above, this increases the recirculation rate and the pressure increase that is possible. However, introducing the control gas into the secondary portion reduces the primary mass flow. When the control gas is admixed with the recirculation flow, the actual recirculation flow decreases, in other words the proportion of product gas in the recirculation flow decreases.

On account of the control gas supply portion, the amount of control gas can be adjusted steplessly between the primary and secondary side, i.e. between the primary portion and the secondary portion. For the case where the SOEC system is designed in the form of a co-electrolysis SOEC system, the widest control range can be achieved if the shape of the ejector is designed for the passage of pure water vapour at the maximum operating point in order to achieve a desired recirculation rate and pressure increase. In a corresponding operating state, the control gas can be exclusively introduced on the secondary side, i.e. into the secondary portion. In partial load operating states, in which the primary process fluid flow, in particular in the form of a water vapour mass flow, no longer corresponds to the intended ejector mass flow, the control gas is, in accordance with the load point, no longer introduced on the secondary side, but rather on the primary side, i.e. into the primary portion. This results in the ejector output falling less sharply in partial load operation and the operating range can thus be significantly extended.

A control gas can be understood to be a gas for controlling the pressure and/or mass flow in the primary portion and in the secondary portion in an open-loop and/or closed-loop manner. In this regard, it should be noted that, by controlling the pressure and/or mass flow in the primary portion in an open-loop and/or closed-loop manner, it is possible to automatically control the pressure and mass flow in the secondary portion in an open-loop and/or closed-loop manner. Accordingly, by controlling the pressure and/or mass flow in the secondary portion in an open-loop and/or closed-loop manner, it is possible to automatically control the pressure and mass flow in the primary portion in an open-loop and/or closed-loop manner.

The control gas supply portion may comprise a plurality of line portions and a plurality of open-loop and/or closed-loop control means arranged therein and/or thereon. The control gas supply portion may further comprise fluid conveying means, such as pumps and/or fans, for conveying the control gas through the various line portions.

The SOEC system should in particular be understood to be a high-temperature SOEC electrolysis system. Furthermore, the SOEC system can also be understood to be a reversibly operable SOFC/SOEC system. The SOEC system is preferably designed in the form of a co-electrolysis SOEC system, in which carbon dioxide is in particular and/or predominantly used as the control gas. The water-containing primary process fluid may comprise water and in particular water vapour, which can be generated by means of an evaporator that can be arranged upstream of the ejector. In other words, the water-containing primary process fluid can be understood to be a water- and/or water vapour-containing primary process fluid. The recirculated secondary process fluid can be understood to be product gas that is generated on the gas side.

The ejector can be understood to be a jet pump having a drive nozzle, a mixing chamber and a diffuser. The drive nozzle can be understood to be the primary portion or at least part of the primary portion. A region upstream of the mixing chamber and downstream of the secondary inlet can be understood to be the secondary portion. The ejector is preferably arranged immediately upstream of the gas side in order to supply the water vapour from the gas side as effectively and efficiently as possible.

The SOEC system may comprise an operating state detection device for detecting a current operating state of the SOEC system. Moreover, the SOEC system may comprise a controller, which is in communication with the operating state detection device and is configured to set the supply of control gas to the primary portion and/or to the secondary portion depending on the detected operating state of the SOEC system. As such, the ejector can be controlled automatically and/or in an automated manner. The operating state detection device may comprise one or more temperature sensors for detecting operating temperatures in the SOEC system, one or more pressure sensors for detecting operating pressures in the SOEC system, one or more mass flow detection means for detecting mass flows in the SOEC system and/or one or more substance sensors for detecting substance compositions in operating fluids, such as the primary process fluid and/or the secondary process fluid.

A process fluid should be understood to mean a fluid that is required for operating the SOEC system. In the present case, the primary process fluid predominantly comprises water vapour, and additionally carbon dioxide. The process fluid downstream of the ejector comprises, in particular, the primary process fluid, the secondary process fluid and/or the control gas. The control of the pressure and/or mass flow should in particular be understood to mean the control of the pressure and/or mass flow of the relevant fluid in the relevant functional portion of the SOEC system. The valve arrangement can be understood as means for blocking and unblocking fluid line portions in the control gas supply portion.

According to another embodiment of the present invention, it is possible for the control gas supply portion to comprise a primary control gas line for conveying the control gas into the primary inlet and/or into the primary line. On account of the primary control gas line, the control gas can be simply and directly guided to the desired position in the primary portion of the ejector. The control gas can be guided into the primary line upstream of the ejector, if necessary upstream of additional functional components of the SOEC system. In an SOECD system according to the invention, it is therefore possible, for example, for a cold side of a heat exchanger to be arranged upstream of the ejector, through which cold side the primary line extends, wherein the primary control gas line leads into the primary line upstream of the cold side. As such, the control gas can be heated before being supplied to the ejector and result in an improved efficiency in the SOEC system. A branch line preferably leads from the recirculation line through the hot side of the heat exchanger. As a result, hot product gas can be used to heat the control gas. This makes it possible to further improve the efficiency of the overall system.

In addition or as an alternative to the primary control gas line, the control gas supply portion in an SOEC system according to the invention may also comprise a secondary control gas line for conveying the control gas into the secondary inlet. On account of the secondary control gas line, the control gas can be simply and directly guided to the desired position in the secondary portion of the ejector.

It is also advantageous if the secondary control gas line in an SOEC system according to the invention is designed to be separate, at least in portions, from the recirculation line. In other words, the secondary control gas supply line is designed to be a dedicated control gas line that is separate from the recirculation line. As a result, control gas can be supplied to the ejector independently of the recirculation flow. This accordingly improves the controllability of the ejector.

Furthermore, in an SOEC system according to the present invention, it is possible for the primary control gas line and the secondary control gas line to be designed so as to be separate from one another at least in portions. In other words, the primary control gas line and the secondary control gas line are designed as dedicated control gas lines. From a circuitry point of view, it is advantageous if the primary control gas line and the secondary control gas line extend in parallel with one another at least in portions, as this is simple to implement. In an advantageous circuit arrangement, the primary control gas line may extend from a main control gas line, which extends from a control gas source, to the primary inlet and/or into the primary line. The secondary control gas line may extend to the secondary inlet from the main control gas line and so as to be separate from the primary control gas line. The main control gas line may accordingly branch off in a forked portion into the primary control gas line and the secondary control gas line.

For simple and reliable open-loop and/or closed-loop control of the control gas to the ejector, it is possible in an SOEC system according to the invention for the valve arrangement to comprise a primary valve in the primary control gas line and a secondary valve in the secondary control gas line. On account of the valves, the primary control gas line and the secondary control gas line can be blocked or unblocked in order to achieve the desired controllability of the ejector, i.e. to introduce the control gas into the primary portion and/or into the secondary portion in the desired manner. As such, the valves can each be understood to be flow controllers for regulating a flow of control gas.

It is also possible for the open-loop and/or closed loop control to take place purely by means of water electrolysis. For this purpose, a second water line for example having another pump may be provided for increasing the pressure. Once the water has been evaporated, it is fed into the feed flow as the primary process fluid or secondary process fluid, such that the evaporated water is used as the control gas. This makes control simple. Water vapour is therefore used as the control gas.

Moreover, it is possible for an SOEC system according to the invention to comprise a control gas source for providing the control gas in the form of carbon dioxide. The control gas source may be a carbon dioxide store, for example in the form of a carbon dioxide tank, and/or a decentralised source of supply for carbon dioxide, for example in the form of recirculated carbon dioxide from other processes during operation of the SOEC system. The use of carbon dioxide as the control gas has been shown to be advantageous in particular in a co-electrolysis SOEC system. In this case, the carbon dioxide is strictly required at the fuel cell stack. By using carbon dioxide as the control gas, it is possible not only to account for the introduction of carbon dioxide into the feed flow as the primary process fluid of the system, which is required for co-electrolysis operation, but also for the desired, improved controllability of the ejector and fluid guidance in the recirculation line. Carbon dioxide has a larger actual volume than water vapour in the same thermodynamic state. In this regard, the invention relates to the manner in which the carbon dioxide is introduced. Said carbon dioxide can be admixed with the water vapour on the primary side of the ejector and also with the recirculation flow on the secondary side of the ejector.

According to another aspect of the present invention, a method is provided for operating an SOEC system of the like described in detail above. The method comprises the following steps:

Detecting a current operating state of the SOEC system by means of an operating state detection device, and Setting the supply of control gas to the primary portion and/or to the secondary portion by means of a controller depending on the detected operating state of the SOEC system.

Therefore, a method according to the invention brings the same advantages as those described in detail in relation to the SOEC system according to the invention. As already explained above in relation to the SOEC system, carbon dioxide or a gas rich in carbon dioxide is preferably used as the control gas. The operating state may be detected or determined based on at least one detected temperature, at least one detected pressure, at least one detected substance composition and/or at least one detected and/or determined mass flow in the SOEC system.

In an alternative embodiment of the present invention, it is also possible for a control gas mass flow to the primary portion to be increased and/or for a control gas mass flow to the secondary portion to be reduced when a partial load operation of the SOEC system is detected. In other words, the gas compositions at the inlets of the ejector, i.e. the feed flows or the primary and secondary process fluids, are set depending on a detected operating state of the SOEC system, in the present case when a partial load operation is detected. By shifting the control gas, in particular in the form of carbon dioxide, from the secondary side to the primary side, the ejector performance can be improved in a simple manner at partial load.

BRIEF DESCRIPTION OF THE SEVERAL VIEWS OF THE DRAWINGS

Other measures that improve the invention can be found in the following description of various exemplary embodiments of the invention, which are represented schematically in the figures, in which.

Elements having the same function and mode of operation are in each case denoted by the same reference signs in the figures.

DESCRIPTION OF SPECIFIC EMBODIMENTS OF THE INVENTION

Figure 1:
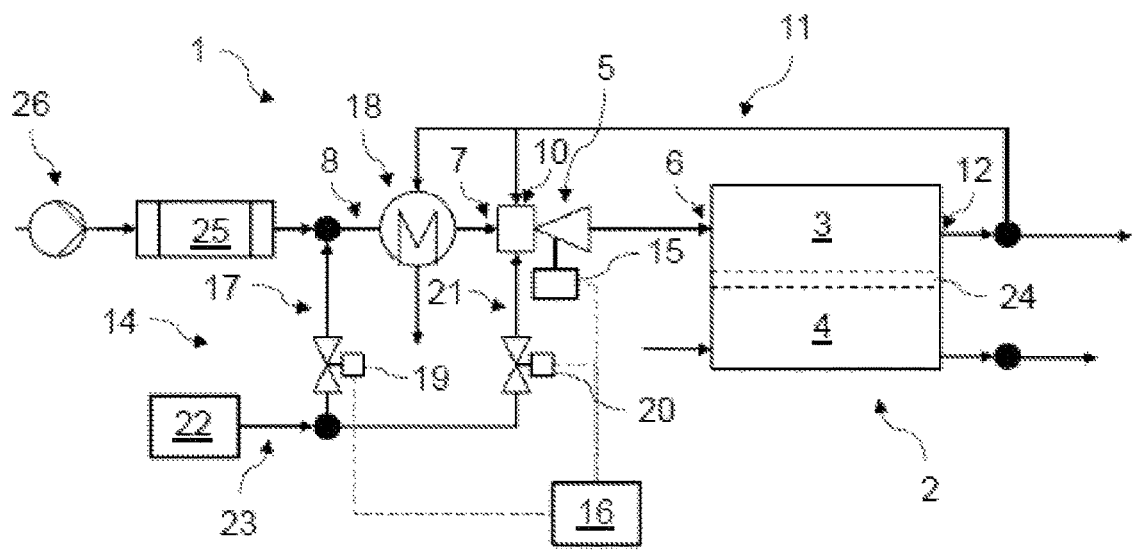
FIG. 1 is a block diagram of an SOEC system according to a preferred embodiment of the present invention.

FIG. 1 shows an SOEC system 1 according to a preferred embodiment in the form of a co-electrolysis SOEC system. The SOEC system 1 shown comprises a fuel cell stack 2 having a gas side 3 and an air side 4. An electrolyte membrane 24 is arranged between the gas side 3 and the air side 4. Moreover, the SOEC system 1 comprises an ejector 5 for supplying a process fluid to a gas inlet 6 on the gas side 3. The ejector 5 comprises a primary inlet 7 for introducing a water-containing primary process fluid through a primary line 8 of the SOEC system 1 into a primary portion 9 of the ejector 5 and a secondary inlet 10 for introducing recirculated secondary process fluid through a recirculation line 11 of the SOEC system 1 from a gas outlet 12 on the gas side 3 into a secondary portion 13 of the ejector 5.

Furthermore, the SOEC system 1 comprises a control gas supply portion 14 for supplying control gas into the primary portion 9 and into the secondary portion 13 in order to control a pressure and/or mass flow in the primary portion 9 and in the secondary portion 13, wherein the control gas supply portion 14 comprises a valve arrangement 19, 20 for controlling the pressure and/or the mass flow in the primary portion 9 and in the secondary portion 13.

More precisely, the control gas supply portion 14 comprises a primary control gas line 17 for conveying the control gas into the primary line 8. Alternatively or additionally, the control gas could be conveyed directly into the primary portion 9. A cold side of a heat exchanger 18 is arranged upstream of the ejector 5, through which cold side the primary line 8 extends, wherein the primary control gas line 17 leads into the primary line 8 upstream of the cold side. Hot product gas, i.e. the recirculated secondary process fluid from the gas side 3 of the fuel cell stack 2, is guided through the hot side of the heat exchanger 18 in order to heat the control gas.

An evaporator 25 for evaporating water is arranged upstream of the cold side of the heat exchanger 18. A pump 26 for conveying water to the evaporator 25 is arranged upstream of the evaporator 25.

The control gas supply portion 14 further comprises a secondary control gas line 21 for conveying the control gas into the secondary inlet 10. The secondary control gas line 21 is designed to be separate from the recirculation line 11. Moreover, the primary control gas line 17 and the secondary control gas line 21 are designed to be separate from one another.

The SOEC system 1 shown also comprises a control gas source 22 for providing the control gas in the form of carbon dioxide. A main control gas line 23 extends from the control gas source 22 and branches off in a forked portion into the primary control gas line 17 and the secondary control gas line 21. The primary control gas line 17 and the secondary control gas line 21 then extend up to the ejector 5 in parallel with one another.

The valve arrangement comprises a primary valve 19 in the primary control gas line 17 and a secondary valve 20 in the secondary control gas line 21, by means of which valves the mass flows can be controlled in an open-loop and/or closed-loop manner in the relevant control gas line.

At the ejector 5, an operating state detection device 15 is designed to detect an operating state in the SOEC system 1. The operating state detection device 15 comprises sensors for detecting a current mass flow through a diffuser 29 of the ejector 5 based on temperature and pressure values in the diffuser 29. The operating state detection device 15, the primary valve 19 and the secondary valve 20 are in signal communication with a controller 16 for actuating the primary valve 19 and secondary valve 20 based on a detected operating state. Nevertheless, the controller 16 can also actuate the primary valve 19 and secondary valve 20 based on directly communicated operating states, as desired. For example, the controller 16 may be informed by a user and/or a digital signal unit as to which operating state, for example partial load or full load, the SOEC system is currently in or is soon to be in.

Figure 2:
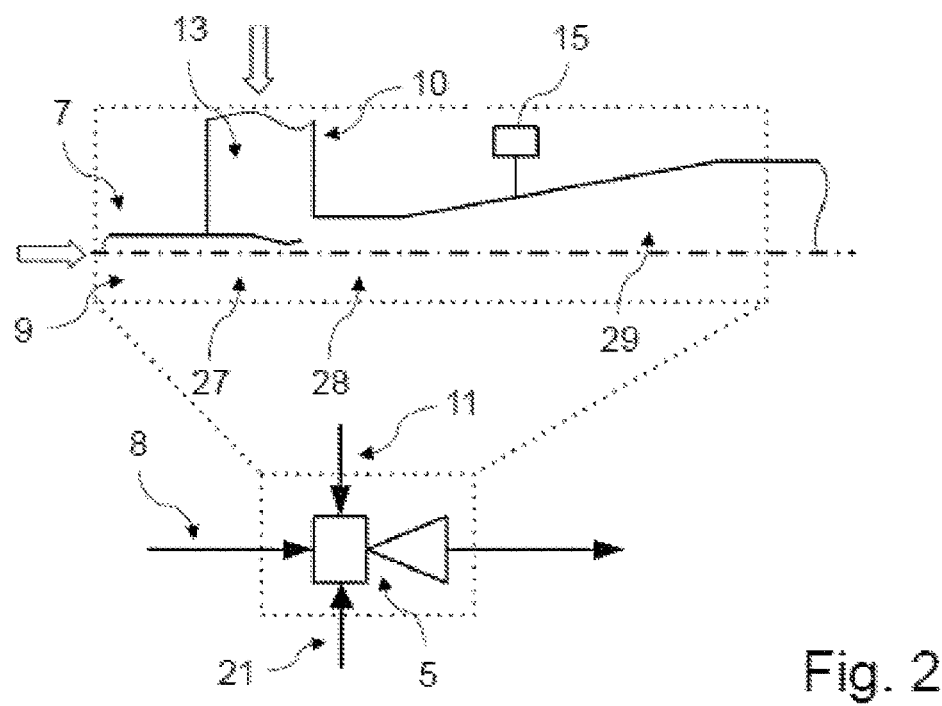
FIG. 2 is a detailed view of an ejector in an SOEC system according to the invention.

FIG. 2 shows the ejector 5 in detail. As shown, the ejector 5 comprises a nozzle 27, a mixing chamber 28 downstream of the nozzle 27 and a diffuser 29 downstream of the mixing chamber 28. The primary inlet 7 and the primary portion 9 are located at the end of the primary line 8 in the region of the nozzle 27 and mixing chamber 28. The recirculation line 11 and the secondary control gas line 21 both adjoin the ejector 5 shown. Said lines both open out in the secondary portion 13, as shown in the magnified view. Alternatively, however, it would also be possible for the recirculation line 11 and the secondary control gas line 21 to open out at the ejector 5 in different fluid inlet portions that are arranged separately from one another, as indicated in the simplified circuit diagram in FIG. 1.

Figure 3:
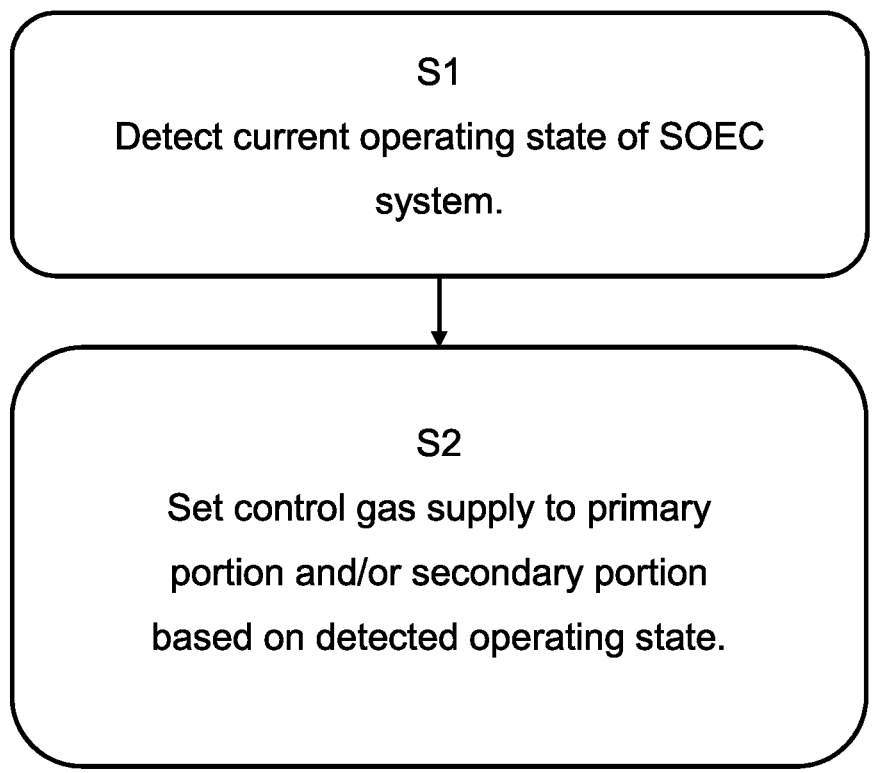
FIG. 3 is a flow diagram for illustrating a method according to the invention.

FIG. 3 is a flow diagram for illustrating a method according to a preferred embodiment. In a first step S1, a current operating state of the SOEC system 1 is detected by means of the operating state detection device 15. This can be done based on current operating parameters in the SOEC system 1 or based on a predefined or desired operating state. Then, in a second step S2, the supply of control gas is set to the primary portion 9 and/or to the secondary portion 13 by means of the controller 16 depending on the detected operating state of the SOEC system 1. When a partial load operation of the SOEC system 1 is detected, a control gas mass flow to the primary portion 9 is increased and/or a control gas mass flow to the secondary portion 13 is reduced.

The invention allows other design principles in addition to the embodiments set out above. In other words, the invention should not be considered limited to the exemplary embodiments explained with reference to the figures.

LIST OF REFERENCE SIGNS

1 SOEC system
2 Fuel cell stack
3 Gas side
4 Air side
5 Ejector
6 Gas inlet
7 Primary inlet
8 Primary line
9 Primary portion
10 Secondary inlet
11 Recirculation line
12 Gas outlet 13 Secondary portion
14 Control gas supply portion
15 Operating state detection device
16 Controller
17 Primary control gas line
18 Heat exchanger
19 Primary valve
20 Secondary valve
21 Secondary control gas line
22 Control gas source
23 Main control gas line
24 Electrolyte membrane
25 Evaporator
26 Pump
27 Nozzle
28 Mixing chamber
29 Diffuser

The invention claimed is:

1. SOEC system (1), comprising:
a fuel cell stack (2) having a gas side (3) and an air side (4);
an ejector (5) for supplying a process fluid to a gas inlet (6) on the gas side (3), wherein the ejector (5) comprises a primary inlet (7) for introducing a water-containing primary process fluid through a primary line (8) of the SOEC system (1) into a primary portion (9) of the ejector (5), and a secondary inlet (10) for introducing recirculated secondary process fluid through a recirculation line (11) of the SOEC system (1) from a gas outlet (12) on the gas side (3) into a secondary portion (13) of the ejector (5), and a control gas supply portion (14) for supplying control gas into the primary portion (9) and into the secondary portion (13) in order to control a pressure and/or mass flow in the primary portion (9) and in the secondary portion (13),
wherein the control gas supply portion (14) comprises a valve arrangement (19, 20) for controlling the pressure and/or the mass flow in the primary portion (9) and in the secondary portion (13).

2. SOEC system (1) according to claim 1, wherein the control gas supply portion (14) comprises a primary control gas line (17) for conveying the control gas into the primary inlet (7) and/or into the primary line (8).

3. SOEC system (1) according to claim 2, wherein a cold side of a heat exchanger (18) is arranged upstream of the ejector (5) through which cold side the primary line (8) extends, wherein the primary control gas line (17) leads into the primary line (8) upstream of the cold side.

4. SOEC system (1) according to claim 1, wherein the control gas supply portion (14) comprises a secondary control gas line (21) for conveying the control gas into the secondary inlet (10).

5. SOEC system (1) according to claim 4, wherein the secondary control gas line (21) is designed to be separate, at least in portions, from the recirculation line (11).

6. SOEC system (1) according to claim 4, wherein the primary control gas line (17) and the secondary control gas line (21) are designed to be separate from one another at least in portions.

7. SOEC system (1) according to claim 4, wherein the valve arrangement comprises a primary valve (19) in the primary control gas line (17) and a secondary valve (20) in the secondary control gas line (21).

8. SOEC system (1) according to claim 1, comprising a control gas source (22) for providing the control gas in the form of carbon dioxide.

9. Method for operating the SOEC system (1) according to claim 1, comprising the steps of:
detecting a current operating state of the SOEC system (1) by an operating state detection device (15), and
setting the supply of control gas to the primary portion (9) and/or to the secondary portion (13) by a controller (16) depending on the detected operating state of the SOEC system (1).

10. Method according to claim 9, wherein,
when a partial load operation of the SOEC system (1) is detected, a control gas mass flow to the primary portion (9) is increased and/or a control gas mass flow to the secondary portion (13) is reduced.

* * * * *